(12) United States Patent
Jung et al.

(10) Patent No.: US 9,203,089 B2
(45) Date of Patent: Dec. 1, 2015

(54) POSITIVE ACTIVE MATERIAL FOR RECHARGEABLE LITHIUM BATTERY AND RECHARGE LITHIUM BATTERY INCLUDING THE SAME

(75) Inventors: Suk-Chul Jung, Yongin-si (KR);
Young-Chul You, Yongin-si (KR);
Hak-Seok Kang, Yongin-si (KR);
Heung-Min Oh, Yongin-si (KR);
Young-Hoon Do, Yongin-si (KR);
Tae-Jin Jung, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 501 days.

(21) Appl. No.: 13/200,402

(22) Filed: Sep. 23, 2011

(65) Prior Publication Data

US 2012/0231351 A1  Sep. 13, 2012

(30) Foreign Application Priority Data

Mar. 8, 2011  (KR) .................. 10-2011-0020494

(51) Int. Cl.
*H01M 10/056* (2010.01)
*H01M 4/131* (2010.01)
*H01M 4/525* (2010.01)
*H01M 10/052* (2010.01)

(52) U.S. Cl.
CPC .............. *H01M 4/525* (2013.01); *H01M 4/131* (2013.01); *H01M 10/052* (2013.01); *Y02E 60/122* (2013.01)

(58) Field of Classification Search
CPC .... H01M 4/525; H01M 4/131; H01M 10/052
USPC ................................ 429/341, 223; 252/182.1
See application file for complete search history.

(56) References Cited

U.S. PATENT DOCUMENTS

| 2011/0039159 A1* | 2/2011 | Ryu et al. ...................... 429/223 |
| 2011/0089367 A1* | 4/2011 | Shin et al. .................. 252/182.1 |
| 2012/0034516 A1 | 2/2012 | Koo et al. |

FOREIGN PATENT DOCUMENTS

| JP | 2000021402 A | * 1/2000 | ............. H01M 4/58 |
| KR | 10 2003-0073168 A | 9/2003 | |
| KR | 10 2005-0096019 A | 10/2005 | |
| KR | 10 2006-0130964 A | 12/2006 | |
| KR | 10 2007-0060784 A | 6/2007 | |
| KR | 100734225 | * 7/2007 | ............. H01M 4/58 |
| KR | 10 2009-0006898 A | 1/2009 | |
| KR | 10 2010-0052419 A | 5/2010 | |

OTHER PUBLICATIONS

Korean Notice of Allowance for KR 10-2011-0020494 dated Apr. 4, 2013.
Chen, et al.; The Search for Cathode and Anode Traps in High-Voltage Stressed Silicon Oxides; J. Electrochem. Soc.; Apr. 1998; 1292-1296; vol. 145, Issue No. 4.; The Electrochemical Society, Inc.; United States.

* cited by examiner

*Primary Examiner* — Karie O'Neill Apicella
(74) *Attorney, Agent, or Firm* — Lee & Morse, P.C.

(57) ABSTRACT

A positive active material for a rechargeable lithium battery including a lithium-nickel cobalt manganese composite metal oxide; and 0.18 to 0.25 wt % of sulfur is provided.

7 Claims, 3 Drawing Sheets

POSITIVE ACTIVE MATERIAL FOR RECHARGEABLE LITHIUM BATTERY AND RECHARGE LITHIUM BATTERY INCLUDING THE SAME

RELATED APPLICATIONS

This application claims priority to and the benefit of Korean Patent Application No. 10-2011-0020494 filed in the Korean Intellectual Property Office on Mar. 8, 2011, the entire contents of which are incorporated herein by reference.

BACKGROUND

1. Field

A positive active material for a rechargeable lithium battery and a rechargeable lithium battery including the same are related.

2. Description of the Related Art

Much research has been recently made on increasing energy density to accomplish a rechargeable lithium battery with high-capacity. In particular, most attention has been made to an attempt of increasing energy density of a battery by using Si-based oxide or Sn-based oxide, their alloy, and the like, which are known to have high capacity, as a negative active material. However, these negative active materials have a problem of big initial irreversible capacity.

Conventionally, a Li2MoO3 material may be mixed with a positive active material to compensate initial irreversible capacity but have an unstable structure. Accordingly, other elements are added there to improve stability. However, the initial irreversible capacity problem may not be sufficiently solved, bringing about another problem of Mo dissolution during the repetitive charge and discharge cycles. In addition, graphite, a conventional negative electrode material, has initial irreversible capacity ranging from 20 to 60% of the entire amount of Li inserted into the graphite (J. Eloctrochem. Soc., Vol. 145, No. 4, April 1998) and thus, needs an extra Li source.

SUMMARY

An exemplary embodiment of the present invention provides a positive active material for a rechargeable lithium battery which improves cycle-life characteristics at low temperature and high temperature.

Another embodiment of the present invention provides a rechargeable lithium battery with improved cycle-life characteristics at low temperature and high temperature by including the positive active material.

According to one embodiment of the present invention, a positive active material for a rechargeable lithium battery includes a lithium-nickel cobalt manganese composite metal oxide; and about 0.18 wt % to about 0.25 wt % of sulfur.

The lithium-nickel cobalt manganese composite metal oxide may be represented by the following Chemical Formula 1.

$Li_aNi_xCo_yMn_zM_kO_2$  [Chemical Formula 1]

In Chemical Formula 1,
M is Al, Mg, Ti, Zr, or a combination thereof, $0.95 \leq a \leq 1.10$, $0.45 \leq x \leq 0.65$, $0.15 \leq y \leq 0.25$, $0.15 \leq z \leq 0.35$, $0 \leq k \leq 0.1$, and $x+y+z+k=1$.

According to another embodiment of the present invention, a rechargeable lithium battery is provided that includes a negative electrode including a negative active material; a positive electrode including a positive active material; and a non-aqueous electrolyte. The positive active material includes a lithium-nickel cobalt manganese composite metal oxide and about 0.18 wt % to about 0.25 wt % of sulfur.

In the rechargeable lithium battery, the lithium-nickel cobalt manganese composite metal oxide may be represented by the following Chemical Formula 1.

$Li_aNi_xCo_yMn_zM_kO_2$  [Chemical Formula 1]

In Chemical Formula 1,
M is Al, Mg, Ti, Zr, or a combination thereof, $0.95 \leq a \leq 1.10$, $0.45 \leq x \leq 0.65$, $0.15 \leq y \leq 0.25$, $0.15 \leq z \leq 0.35$, $0 \leq k \leq 0.1$, and $x+y+z+k=1$.

The negative active material includes a material that reversibly intercalates/deintercalates lithium ions, a lithium metal, a lithium metal alloy, a material being capable of doping and dedoping lithium, or a transition metal oxide.

The non-aqueous electrolyte may include a non-aqueous organic solvent of a carbonate-based, ester-based, ether-based, ketone-based, alcohol-based, or aprotic solvent.

The non-aqueous electrolyte may include about 0.1 to about 2.0M lithium salt.

A rechargeable lithium battery having improved low temperature cycle-life and high temperature cycle-life is provided.

DETAILED DESCRIPTION

Figure 1:
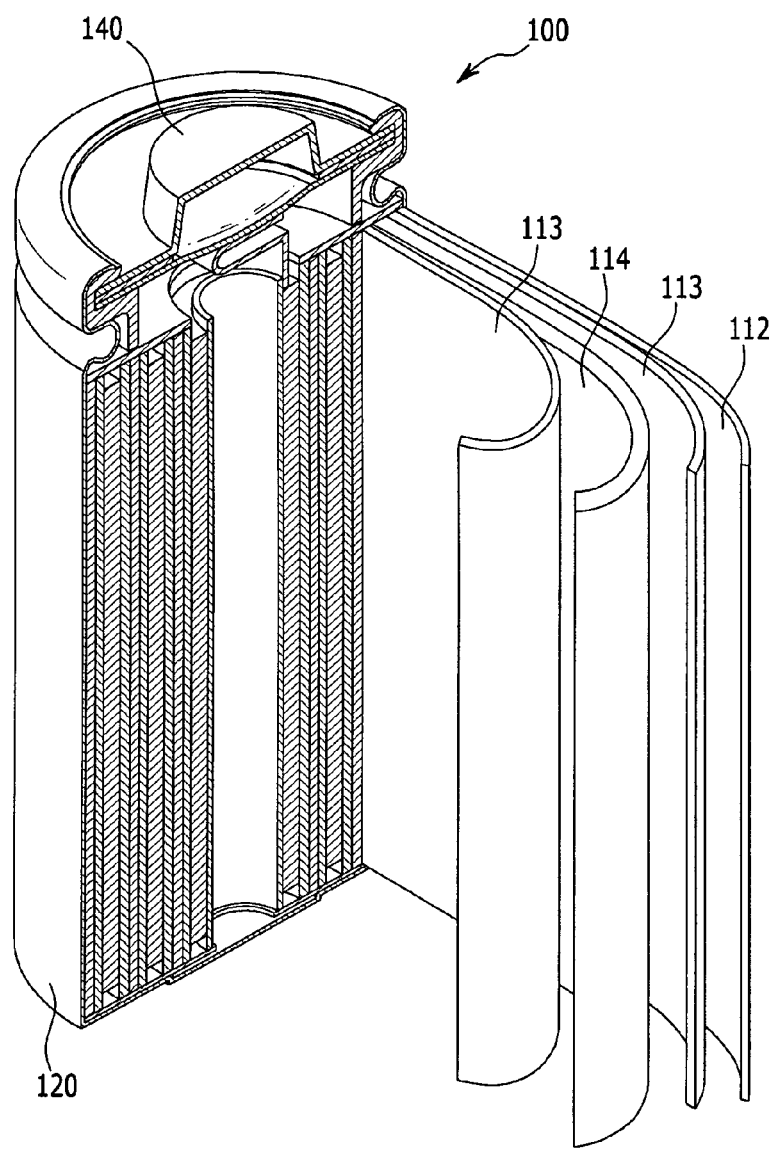
FIG. 1 is a schematic view showing the structure of a rechargeable lithium battery according to one embodiment of the present invention.

Exemplary embodiments will hereinafter be described in detail. However, these embodiments are only exemplary, and the present invention is not limited thereto.

According to one embodiment of the present invention, a positive active material for a rechargeable lithium battery includes a lithium-nickel cobalt manganese composite metal oxide; and about 0.18 wt % to about 0.25 wt % of sulfur.

A positive active material including sulfur in an amount of a particular range may be used for a rechargeable lithium battery to improve the cycle-life characteristics at low temperature, e.g., about 5° C. or at high temperatures. According to one embodiment, the positive active material for a rechargeable lithium battery may include sulfur in an amount of about 0.20 wt % to about 0.25 wt %.

The lithium-nickel cobalt manganese composite metal oxide may be represented by the following Chemical Formula 1.

$Li_aNi_xCo_yMn_zM_kO_2$  [Chemical Formula 1]

In Chemical Formula 1,
M is Al, Mg, Ti, Zr, or a combination thereof, $0.95 \leq a \leq 1.10$, $0.45 \leq x \leq 0.65$, $0.15 \leq y \leq 0.25$, $0.15 \leq z \leq 0.35$, $0 \leq k \leq 0.1$, and $x+y+z+k=1$.

The positive active material may be prepared by using a $SO_4$-based compound, such as $NiSO_4$, $CoSO_4$, or $MnSO_4$ as a precursor compound of Ni, Co or Mn, co-precipitating it so as to acquire a mixed metal hydroxide $(Ni_{1-x}Co_{1-y}Mn_{1-z})$ (OH)$_2$, and mixing and baking the mixed metal hydroxide precursor with a Li precursor compound.

Since the SO$_4$-based compound is used as a precursor compound of Ni, Co and Mn, the above-prepared positive active material includes sulfur in the form of a compound.

The sulfur compound may exist in the form of a precursor compound of unreacted Ni, Co and Mn or another sulfur compound. Since it exists by being mixed with the above-prepared mixed metal hydroxide ((Ni$_{1-x}$Co$_{1-y}$Mn$_{1-z}$)(OH)$_2$), the amount of sulfur may be decreased by rinsing and using the above-prepared mixed metal hydroxide ((Ni$_{1-x}$Co$_{1-y}$Mn$_{1-z}$)(OH)$_2$. The amount of sulfur in the final positive active material may be controlled to range from about 0.18 wt % to about 0.25 wt % by controlling the amount of sulfur as described above. For example, a positive active material may be prepared by controlling the extent of washing with water and the amount of sulfur based on a trial and error method.

The lithium-nickel cobalt manganese composite metal oxide may have a coating layer on the surface or may be mixed with the compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxy carbonate of a coating element. The compounds for a coating layer may be amorphous or crystalline. The coating element for a coating layer may include Mg, Al, Co, K, Na, Ca, Si, Ti, V, Sn, Ge, Ga, B, As, Zr, or a mixture thereof. The coating layer can be formed in any method having no negative influence on properties of a positive active material by adding these elements to the compound. For example, the method may include any coating method such as spray coating, dipping, and the like, but is not illustrated in more detail since it is well-known to a skilled person in the related field.

The positive active material layer may include a binder and a conductive material.

The binder improves binding properties of the positive active material particles to each other and to a current collector. Examples of the binder include at least one of polyvinylalcohol, carboxylmethylcellulose, hydroxypropylcellulose, diacetylcellulose, polyvinylchloride, a carboxylated polyvinylchloride, polyvinyl fluoride, polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

Any electrically conductive material may be used as a conductive material unless it causes a chemical change. Examples of the conductive material include: carbon-based materials such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; and mixtures thereof.

Another embodiment of the present invention provides a rechargeable lithium battery fabricated using the positive active material for a rechargeable lithium battery. The rechargeable lithium battery shows improved low temperature cycle-life and high temperature cycle-life.

The rechargeable lithium battery may include a negative electrode including a negative active material; a positive electrode including the aforementioned positive active material; and a non-aqueous electrolyte.

Rechargeable lithium batteries may be classified into lithium ion batteries, lithium ion polymer batteries, and lithium polymer batteries according to the presence of a separator and the kind of electrolyte used in the battery. The rechargeable lithium batteries may have a variety of shapes and sizes, and include cylindrical, prismatic, or coin-type batteries, and may be thin film batteries or may be rather bulky in size. The structure and the fabrication method for lithium ion batteries are well known in the art and will not be illustrated.

FIG. 1 is an exploded perspective view of a rechargeable lithium battery according to one embodiment. FIG. 1 illustrates a cylindrical rechargeable lithium battery 100, which includes a negative electrode 112, a positive electrode 114, a separator 113 interposed between the negative electrode 112 and the positive electrode 114, an electrolyte (not shown) impregnating the separator 113, a battery case 120, and a sealing member 140 sealing the battery case 120. The negative electrode 112, positive electrode 114, and separator 113 are sequentially stacked, spirally wound, and placed in a battery case 120 to fabricate such a rechargeable lithium battery 100.

The negative electrode includes a current collector and a negative active material layer disposed on the current collector. The negative active material layer includes a negative active material.

The negative active material may include a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions includes a carbon material. The carbon material may be any generally-used carbon-based negative active material for a lithium ion rechargeable battery. Examples of the carbon material include crystalline carbon, amorphous carbon, or a mixture thereof. The crystalline carbon may be non-shaped, or sheet, flake, spherical, or fiber shaped natural graphite or artificial graphite. The amorphous carbon may be a soft carbon, a hard carbon, mesophase pitch carbonized products, fired coke, or the like.

Examples of the lithium metal alloy includes lithium and a metal selected from Na, K, Rb, Cs, Fr, Be, Mg, Ca, Sr, Si, Sb, Pb, In, Zn, Ba, Ra, Ge, Al, or Sn.

Examples of the material being capable of doping and dedoping lithium include Si, SiOx (0<x<2), a Si-Q alloy (where Q is an element selected from the group consisting of an alkaline metal, an alkaline-earth metal, a group 13 element, a group 14 element, a group 15 element, a group 16 element, a transition element, a rare earth element, and combinations thereof, and is not Si), Sn, SnO2, a Sn—R alloy (where R is an element selected from the group consisting of an alkaline metal, an alkaline-earth metal, a group 13 element, a group 14 element, a group 15 element, a group 16 element, a transition element, a rare earth element, and combinations thereof, and is not Sn), and mixtures thereof. At least one of these materials may be mixed with SiO2. The elements, Q and R are Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide include vanadium oxide, lithium vanadium oxide, or the like.

The negative active material layer may include a binder and optionally a conductive material.

The binder improves binding properties of the negative active material particles to each other and to a current collector. Examples of the binder include at least one polyvinylalcohol, carboxylmethylcellulose, hydroxypropylcellulose, polyvinylchloride, carboxylated polyvinylchloride, polyvinyl fluoride, polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but are not limited thereto.

The conductive material is included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, and a carbon fiber; a metal-based material such as a metal powder or a metal fiber including copper, nickel, aluminum, and silver; a conductive polymer such as a polyphenylene derivative; and a mixture thereof.

The current collector includes a copper foil, a nickel foil, a stainless steel foil, a titanium foil, a nickel foam, a copper foam, a polymer substrate coated with a conductive metal, or combinations thereof.

The positive electrode includes a current collector and a positive active material layer disposed on the current collector.

The current collector may include Al, but is not limited thereto.

The positive active material is the same as described above.

The negative and positive electrodes may be fabricated in a method including mixing the active material, a binder, and optionally, a conductive material to provide an active material composition, and coating the composition on a current collector followed by drying and compressing it. The electrode-manufacturing method is well known and thus is not described in detail in the present specification. The solvent includes N-methylpyrrolidone and the like, but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethyl acetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio can be controlled in accordance with a desirable battery performance.

The carbonate-based solvent may include a mixture of a cyclic carbonate and a linear carbonate. The cyclic carbonate and the linear carbonate are mixed together in a volume ratio of about 1:1 to about 1:9. When the mixture is used as an electrolyte, the electrolyte performance may be enhanced.

In addition, the non-aqueous organic electrolyte may further include the mixture of a carbonate-based solvent and an aromatic hydrocarbon-based solvent. The carbonate-based solvent and the aromatic hydrocarbon-based solvent may be mixed together in a volume ratio ranging from about 1:1 to about 30:1.

The aromatic hydrocarbon-based organic solvent may be represented by the following Chemical Formula 1.

[Chemical Formula 1]

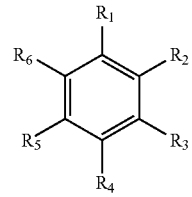

In Chemical Formula 1, $R_1$ to $R_6$ are independently selected from the group consisting of hydrogen, a halogen, a C1 to C10 alkyl group, a C1 to C10 haloalkyl group, and a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate, an ethylene carbonate-based compound of the following Chemical Formula 2, or a combination thereof in order to improve cycle-life of a battery.

[Chemical Formula 2]

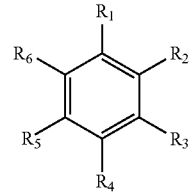

In Chemical Formula 2, R7 and R8 are independently hydrogen, a halogen, a cyano group (CN), a nitro group (NO2), or a C1 to C5 fluoroalkyl group, provided that at least one of R7 and R8 is a halogen, a cyano group (CN), a nitro group (NO2), or a C1 to C5 fluoroalkyl group.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amount of the vinylene carbonate or the ethylene carbonate-based compound may be adjusted within an appropriate range.

The lithium salt is dissolved in an organic solvent, supplies lithium ions in the battery, operates basic operation of a rechargeable lithium battery, and improves lithium ion transport between positive and negative electrodes. Examples of the lithium salt include at least one supporting salt selected from LiPF6, LiBF4, LiSbF6, LiAsF6, LiN(SO2C2F5)2, Li(CF3SO2)2N, LiN(SO3C2F5)2, LiC4F9SO3, LiClO4, LiAlO2, LiAlCl4, LiN(CxF2x+1SO2)(CyF2y+1SO2) (where x and y are natural numbers), LiCl, LiI, and LiB(C2O4)2 (lithium bisoxalato borate, LiBOB). The lithium salt may be used in a concentration ranging from about 0.1 M to about 2.0 M. When the lithium salt is included at the above concentration range, electrolyte performance and lithium ion mobility may be enhanced due to optimal electrolyte conductivity and viscosity.

The rechargeable lithium battery may further include a separator between the negative electrode and the positive electrode, as needed. Examples of suitable separator materials include polyethylene, polypropylene, polyvinylidene fluoride, and multi-layers thereof, such as a polyethylene/polypropylene double-layered separator, a polyethylene/polypropylene/polyethylene triple-layered separator, and a polypropylene/polyethylene/polypropylene triple-layered separator.

The following examples illustrate this disclosure in more detail. These examples, however, are not in any sense to be interpreted as limiting the scope of this disclosure.

EXAMPLE

Preparation of Positive Active Material

Example 1

NiSO4, CoSO4 and MnSO4 aqueous solutions each of which has a concentration of about 3M were mixed in a mole ratio of about 5:2:3, and about 7M NaOH aqueous solution and about 1M NH4OH aqueous solution were added to the mixture and continuously mixed in a co-precipitation instrument. The mixture was co-precipitated in pH 11 at a reaction temperature of about 40° C. for a reaction time of about 7 hours at a reaction speed of about 800 rpm so as to obtain a (NiCoMn)OH2 precursor. The precursor was rinsed with H2O, dried in an oven set to about 140° C. and sieved, and then the precursor was mixed with Li2CO3 in a mixer in a mole ratio of about 1:1.05. The obtained mixture was put into a baking container and baked at a temperature of about 950° C. at a rate of about 2° C./min for about 17 hours so as to prepare a lithium metal oxide LiNi0.5Co0.2Mn0.3O2. Since the amount of sulfur, which is the final positive active material, may be controlled according to the extent of the rinsing of the (NiCoMn)OH2 precursor, the extent of the rinsing was controlled appropriately based on the trial and error method so that the contents of the following Table 2 are obtained.

Example 2

A positive active material was prepared according to the same method as Example 1, except that the extent of the rinsing of the (NiCoMn)OH2 precursor of Example 1 was controlled to obtain the amount of sulfur shown in the following Table 2. In Example 2, the process was performed once again onto substantially the same amount of sulfur as the amount of Example 1.

Example 3

A positive active material was prepared according to the same method as Example 1, except that the extent of the rinsing of the (NiCoMn)OH2 precursor of Example 1 was controlled to obtain the amount of sulfur shown in the following Table 2.

Example 4

A positive active material was prepared according to the same method as Example 1, except that the extent of the rinsing of the (NiCoMn)OH2 precursor of Example 1 was controlled to obtain the amount of sulfur shown in the following Table 2.

Comparative Example 1

A positive active material was prepared according to the same method as Example 1, except that the extent of the rinsing of the (NiCoMn)OH2 precursor of Example 1 was controlled to obtain the amount of sulfur shown in the following Table 2. Comparative Example 2

A positive active material was prepared according to the same method as Example 1, except that the extent of the rinsing of the (NiCoMn)OH2 precursor of Example 1 was controlled to obtain the amount of sulfur shown in the following Table 2.

The sulfur amounts of the positive active materials prepared according to Examples 1 and 2, and Comparative Examples 1 to 4 were measured with a inductively coupled plasma (ICP-AES Maker: HORIBA jobin yvon, Type: ULTIMA2) emission spectrometer. The results are presented in the following Table 1.

TABLE 1

| Examples | Amount of S (unit: wt %) |
| --- | --- |
| Example 1 | 0.20 |
| Example 2 | 0.20 |
| Example 3 | 0.25 |
| Example 4 | 0.18 |
| Comparative Example 1 | 0.27 |
| Comparative Example 2 | 0.12 |

(Fabrication of Rechargeable Lithium Battery Cell)

Rechargeable lithium battery cells using the positive active materials prepared according to Examples 1 to 4 and Comparative Examples 1 and 2 were prepared, respectively.

Slurries were prepared by mixing about 96 wt % of the positive active material prepared according to Examples 1 and 2 and Comparative Examples 1 to 4, about 2 wt % of polyvinylidene fluoride (PVDF), and about 2 wt % of acetylene black, and dispersing the mixture in N-methyl-2-pyrrolidone. Subsequently, positive electrodes were fabricated by coating a 20 μm-thick aluminum foil with each of the positive active material, drying it at about 160° C. for more than about 3 hours, and compressing it.

18650-size full-cell battery cells were fabricated using a graphite-based material as an anode, and the positive electrode and an electrolyte. Herein, as for an electrolyte, a solution prepared by dissolving about 1.15M LiPF6 in a mixed solvent of ethylenecarbonate (EC), ethylmethylcarbonate (EMC), fluorinebenzene (FB), and dimethylcarbonate (DMC) prepared in volume ratio of about 3:5:1:1 was used.

Low-Temperature Cycle-Life Characteristics 5 rechargeable lithium battery cells using each of the positive active materials of Examples 1 to 4 and Comparative Examples 1 and 2 were fabricated, and then the cell capacities of the rechargeable lithium battery cells after performing charge/discharge about 35 times were measured. The average cell capacities were presented in the following Table 2. The cycle-lives of the rechargeable lithium battery cells were measured by performing charge/discharge about 35 times at about 5° C. with about 0.5 C.

TABLE 2

| Examples | Amount of sulfur | Average capacity of five test cells after 35 charge and discharge (unit: mAh/cell) |
|---|---|---|
| Example 1 | 0.20 wt % | 1544.935 |
| Example 2 | 0.20 wt % | 1684.781 |
| Example 3 | 0.25 wt % | 1709.018 |
| Example 4 | 0.18 wt % | 1408.080 |
| Comparative Example 1 | 0.27 wt % | 1530.043 |
| Comparative Example 2 | 0.12 wt % | 1282.540 |

Figure 2:
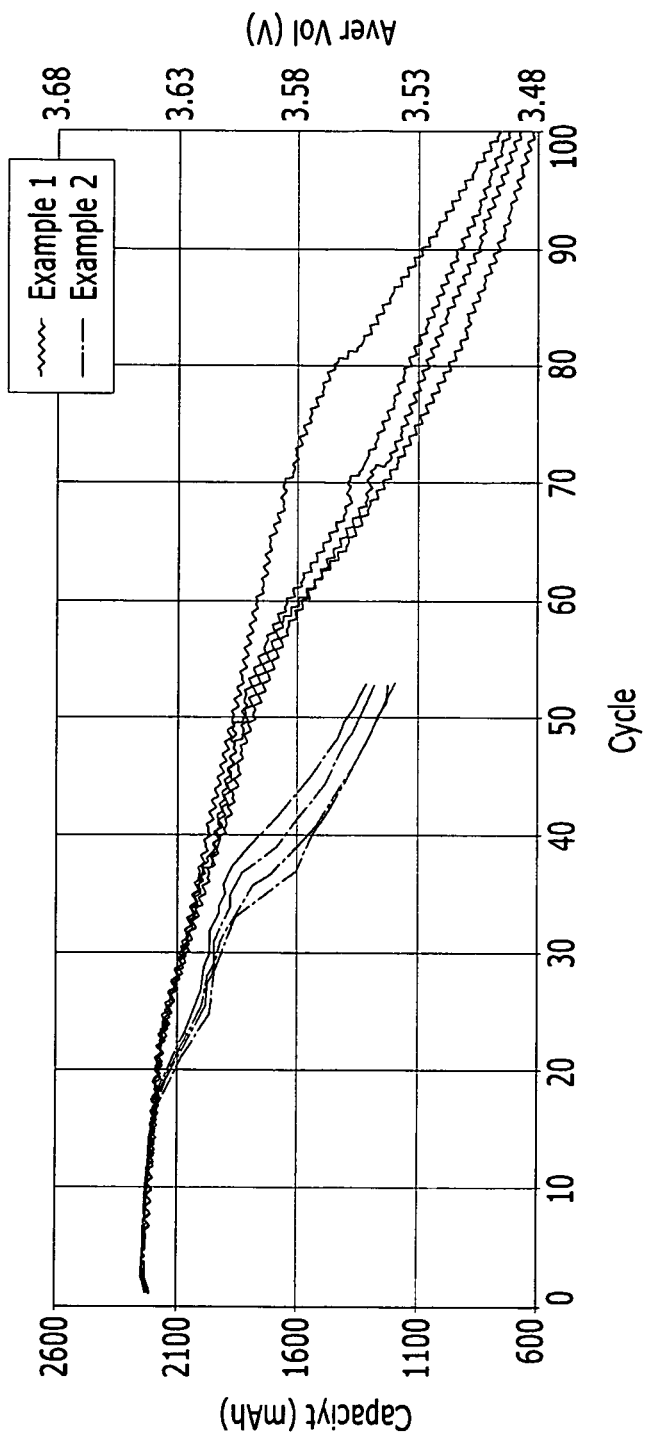
FIG. 2 is a graph showing the capacity according to cycle to measure the cycle-life characteristics of a rechargeable lithium battery cell of Example at high temperature.
Figure 3:
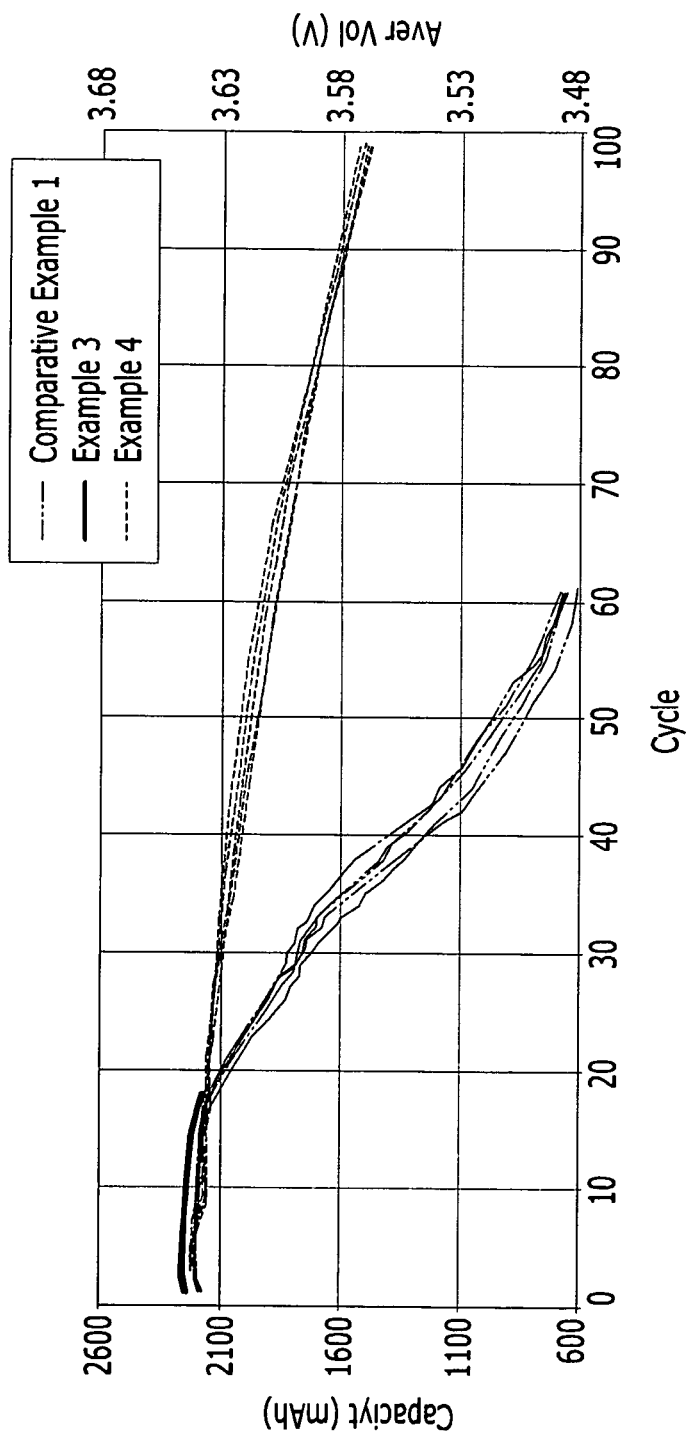
FIG. 3 is a graph showing the capacity according to cycle to measure the cycle-life characteristics of rechargeable lithium battery cells of Example and Comparative Example at high temperature.

High-Temperature Cycle-Life Characteristics 5 rechargeable lithium battery cells using each of the positive active materials of Examples 1 to 4 and Comparative Example 1 were fabricated and charged/discharged, and then the cell capacities of the rechargeable lithium battery cells according to cycles were measured. The cell capacities of Examples 1 and 2 were presented in FIG. 2 and cell capacities of Examples 3 and 4 and Comparative Example 1 were presented in FIG. 3

The cycle-life characteristics of the rechargeable lithium battery cells were measured by performing charge/discharge at about 45° C. with about 0.8 C.

Whereas the rechargeable lithium battery cells using the positive active material of Comparative Example 1 showed poor high-temperature cycle-life characteristics, and the rechargeable lithium battery cells using the positive active material of Comparative Example 2 showed poor low-temperature cycle-life, the rechargeable lithium battery cells using the positive active material of Examples 1 to 4 satisfied both low-temperature cycle-life and high-temperature cycle-life of over a certain level.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positive active material for a rechargeable lithium battery, comprising:
   a lithium-nickel cobalt manganese composite metal oxide; and
   about 0.20 wt % to 0.25 wt % of sulfur, wherein the sulfur is in the form of a precursor compound of unreacted nickel, cobalt and manganese.

2. The positive active material for a rechargeable lithium battery of claim 1, wherein the lithium-nickel cobalt manganese composite metal oxide is represented by the following Chemical Formula 1:

$$Li_aNi_xCo_yMn_zM_kO_2$$ [Chemical Formula 1]

wherein,
M is Al, Mg, Ti, Zr, or a combination thereof, $0.95 \le a \le 1.10$, $0.45 \le x \le 0.65$, $0.15 \le y \le 0.25$, $0.15 \le z \le 0.35$, $0 \le k \le 0.1$, and $x+y+z+k=1$.

3. A rechargeable lithium battery, comprising
   a negative electrode including a negative active material;
   a positive electrode including a positive active material including a lithium-nickel cobalt manganese composite metal oxide and about 0.20 wt % to about 0.25 wt % of sulfur; and
   a non-aqueous electrolyte, wherein the sulfur is in the form of a precursor compound of unreacted nickel, cobalt and manganese.

4. The rechargeable lithium battery of claim 3, wherein the lithium-nickel cobalt manganese composite metal oxide is represented by the following Chemical Formula 1:

$$Li_aNi_xCo_yMn_nM_kO_2$$ [Chemical Formula 1]

wherein,
M is Al, Mg, Ti, Zr, or a combination thereof, $0.95 \le a \le 1.10$, $0.45 \le x \le 0.65$, $0.15 \le y \le 0.25$, $0.15 \le z \le 0.35$, $0 \le k \le 0.1$, and $x+y+z+k=1$.

5. The rechargeable lithium battery of claim 3, wherein the negative active material comprises a material that reversibly intercalates/deintercalates lithium ions, a lithium metal, a lithium metal alloy, a material being capable of doping and dedoping lithium, or a transition metal oxide.

6. The rechargeable lithium battery of claim 3, wherein the non-aqueous electrolyte comprises include a non-aqueous organic solvent of a carbonate-based, ester-based, ether-based, ketone-based, alcohol-based, or aprotic solvent.

7. The rechargeable lithium battery of claim 3, wherein the non-aqueous electrolyte comprises 0.1 to 2.0M lithium salt.

* * * * *